United States Patent
Han

(10) Patent No.: US 11,991,225 B2
(45) Date of Patent: *May 21, 2024

(54) ENABLING BREAKOUT ROOMS IN WEBINARS

(71) Applicant: Zoom Video Communications, Inc., San Jose, CA (US)

(72) Inventor: Lin Han, Los Altos, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,627

(22) Filed: Jan. 13, 2023

(65) Prior Publication Data

US 2023/0144781 A1   May 11, 2023

Related U.S. Application Data

(63) Continuation of application No. 17/245,214, filed on Apr. 30, 2021, now Pat. No. 11,575,720.

(51) Int. Cl.
  *G06F 15/16* (2006.01)
  *H04L 65/401* (2022.01)
  *H04N 7/15* (2006.01)

(52) U.S. Cl.
  CPC ........... *H04L 65/4015* (2013.01); *H04N 7/15* (2013.01)

(58) Field of Classification Search
  None
  See application file for complete search history.

(56) References Cited

U.S. PATENT DOCUMENTS

| | | | |
|---|---|---|---|
| 2004/0003040 A1* | 1/2004 | Beavers | H04N 7/15 348/E7.083 |
| 2011/0203006 A1* | 8/2011 | Gopalakrishnan | H04W 4/18 709/217 |
| 2012/0170726 A1* | 7/2012 | Schwartz | H04M 3/56 379/93.02 |
| 2012/0182384 A1* | 7/2012 | Anderson | H04L 65/1073 348/14.09 |
| 2021/0117213 A1* | 4/2021 | Chen | G06F 9/453 |

* cited by examiner

*Primary Examiner* — Wing F Chan
*Assistant Examiner* — Andrew Woo
(74) *Attorney, Agent, or Firm* — Kilpatrick Townsend & Stockton LLP

(57) ABSTRACT

One example method includes transmitting a message to a first client device indicating a transition to a first sub-meeting of a webinar, the first client device connected to a main meeting of the webinar and associated with a first participant, receiving, from the first client device, a request for access information to join the first sub-meeting; transmitting the access information for the first sub-meeting to the first client device, receiving, from the first client device, a request to join the first sub-meeting, the request based on the access information for the first sub-meeting, and joining the first client device to the first sub-meeting.

20 Claims, 7 Drawing Sheets

ENABLING BREAKOUT ROOMS IN WEBINARS

This application is a continuation of U.S. patent application Ser. No. 17/245,214, filed Apr. 30, 2021, titled "Systems and Methods for Enabling Breakout Rooms in Webinars," now U.S. Pat. No. 11,575,720, the entirety of which is hereby incorporated by reference.

FIELD

The present application generally relates to breakout rooms for video conferences and more particularly relates to systems and methods for enabling breakout rooms in webinars.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for enabling breakout rooms in webinars. One example method includes transmitting a message to a first client device indicating a transition to a first sub-meeting of a webinar, the first client device connected to a main meeting of the webinar and associated with a first participant, receiving, from the first client device, a request for access information to join the first sub-meeting; transmitting the access information for the first sub-meeting to the first client device, receiving, from the first client device, a request to join the first sub-meeting, the request based on the access information for the first sub-meeting, and joining the first client device to the first sub-meeting.

One example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to transmit, using the communications interface, a message to a first client device indicating a transition to a first sub-meeting of a webinar, the first client device connected to a main meeting of the webinar and associated with a first participant; receive, from the first client device using the communications interface, a request for access information to join the first sub-meeting; transmit, using the communications interface, the access information for the first sub-meeting to the first client device; receive, from the first client device using the communications interface, a request to join the first sub-meeting, the request based on the access information for the first sub-meeting; and join the first client device to the first sub-meeting.

One example non-transitory computer-readable medium comprising processor-executable instructions configured to cause one or more processors to transmit a message to a first client device indicating a transition to a first sub-meeting of a webinar, the first client device connected to a main meeting of the webinar; receive, from the first client device, a request for access information to join the first sub-meeting; transmit the access information for the first sub-meeting to the first client device; receive, from the first client device, a request to join the first sub-meeting, the request based on the access information for the first sub-meeting; and join the first client device to the first sub-meeting.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
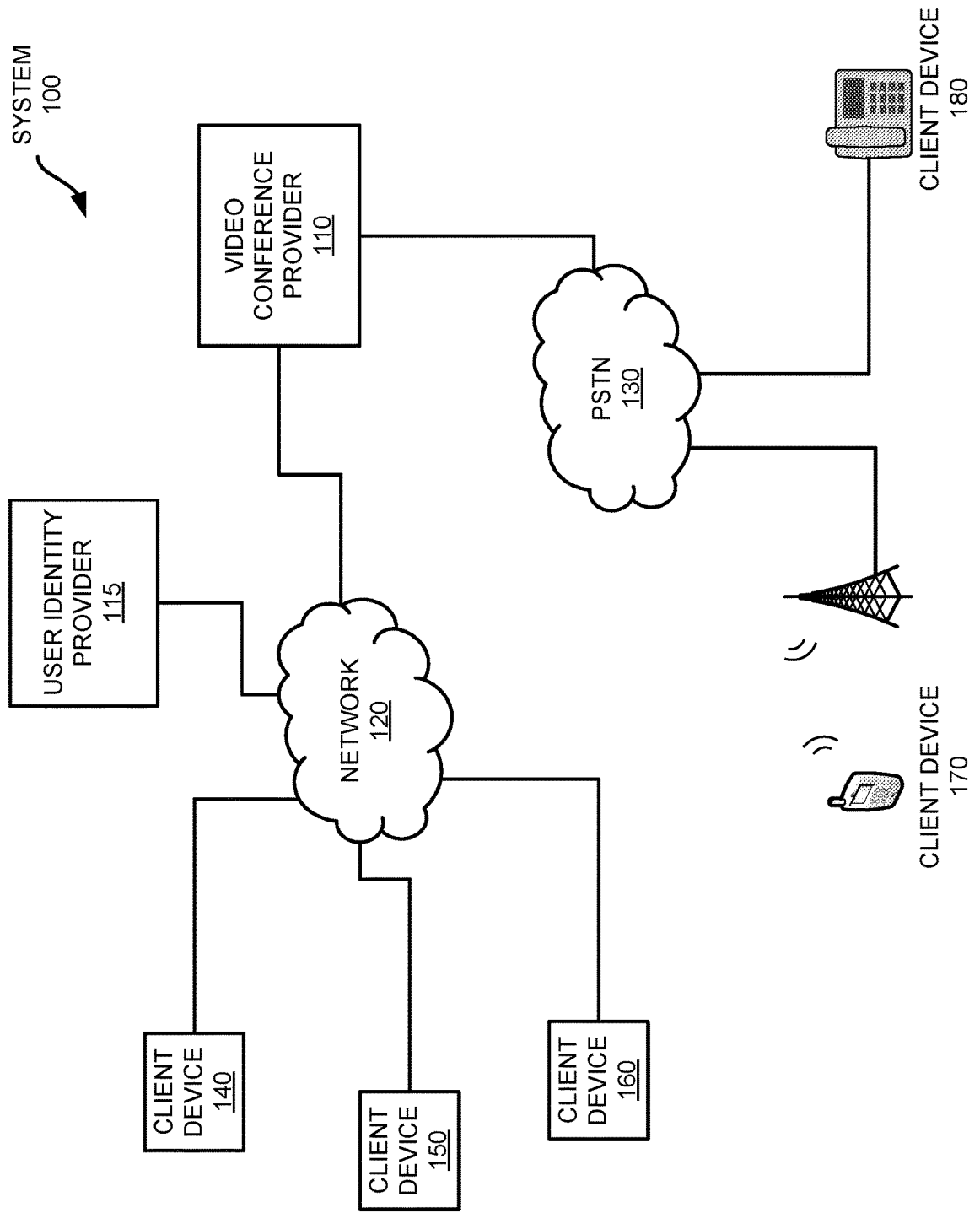
FIGS. 1, 2, and 3A-3B show example systems for enabling breakout rooms in webinars.

Examples are described herein in the context of systems and methods for enabling breakout rooms in webinars. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

Managing a video conference having that many individuals can be a challenging task for the webinar host(s). For example, if the host(s) would like to allow the participants to break away from the main webinar presentation to participate in separate smaller group discussions or "breakout rooms," simply assigning the participants to the smaller groups can be a significant task. This can be exacerbated if tens of thousands of participants need to be moved into thousands of different breakout rooms.

For a video conference provider that provides the capability of having these separate breakout rooms, the process of creating a large number of breakout rooms and moving all of the webinar participants to their respective breakout rooms can involve transmitting a significant amount of information to many participants, such as by sending all breakout room assignments and information to all participants. This may be feasible with a small number of participants or a small number of breakout rooms, but results in most information received by any given client device being inapplicable since the client device will only join one breakout room. In addition, webinar breakout rooms may be assigned based on specific subject matter or may have confidential subject matter discussed, and thus simply broadcasting all breakout room assignments and information to all participants, or posting such information to a location for the client devices to access, may be undesirable.

Instead, to enable a video conference provider to move large numbers of participants from a main meeting to a variety of different breakout rooms, when the webinar reaches a stage when the participants are to be moved into breakout rooms, the video conference provider may initiate sub-meetings corresponding to each of the breakout rooms and then broadcast breakout room assignments to all participants, e.g., by broadcasting one or more messages that provides a correspondence between each participant and a breakout room. Alternatively, it may send individual messages to each participant's client device with their respective breakout room assignment.

Once a participant's client device receives the assignment, it transmits a request to the video conference provider to be joined to the assigned breakout room. When the video conference provider receives the request, it verifies that the request identifies the breakout room the participant is assigned to and, in some examples, authenticates the participant, such as by using a third party user identity provider. If the request identifies the right breakout room (and the user's identity is confirmed, if authentication is used), the video conference provider provides the information needed by the client device to access the sub-meeting corresponding to the assigned breakout room. The client device then uses the access information to access the video and audio feeds from the sub-meeting and to discontinue receipt of the video and audio feeds from the main meeting, at which point, the client device has joined the breakout room.

By using such techniques, the video conference provider is able to assign large numbers of participants to a large number of different breakout rooms without the need to send an enormous amount of information to the participants in the meeting and without potentially enabling participants to join breakout rooms they have not been assigned to. By requiring the participants' client devices to request access to the breakout rooms, the video conference provider can effectively queue the large number of incoming requests and handle them quickly, such as by distributing the requests internally to multiple different servers, which may then respond appropriately. This may reduce the amount of time needed to process breakout room requests and reduce the amount of bandwidth any individual participant's client device needs to consume to receive its breakout room assignment and then join the assigned breakout room. Still further advantages may be illustrated throughout this disclosure.

This illustrative example is given to introduce the reader to the general subject matter discussed herein and the disclosure is not limited to this example. The following sections describe various additional non-limiting examples and examples of systems and methods for enabling breakout rooms in webinars.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
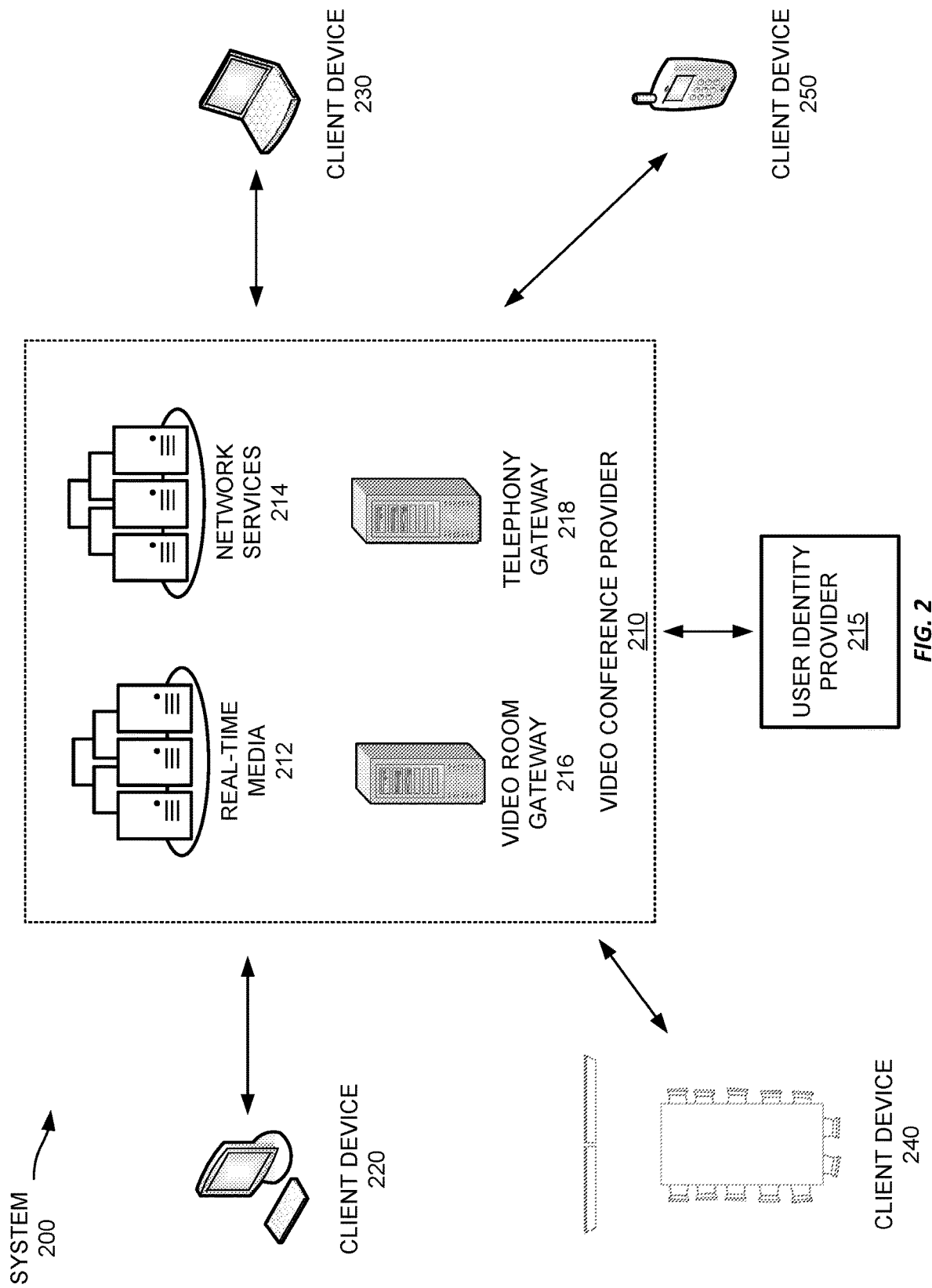

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
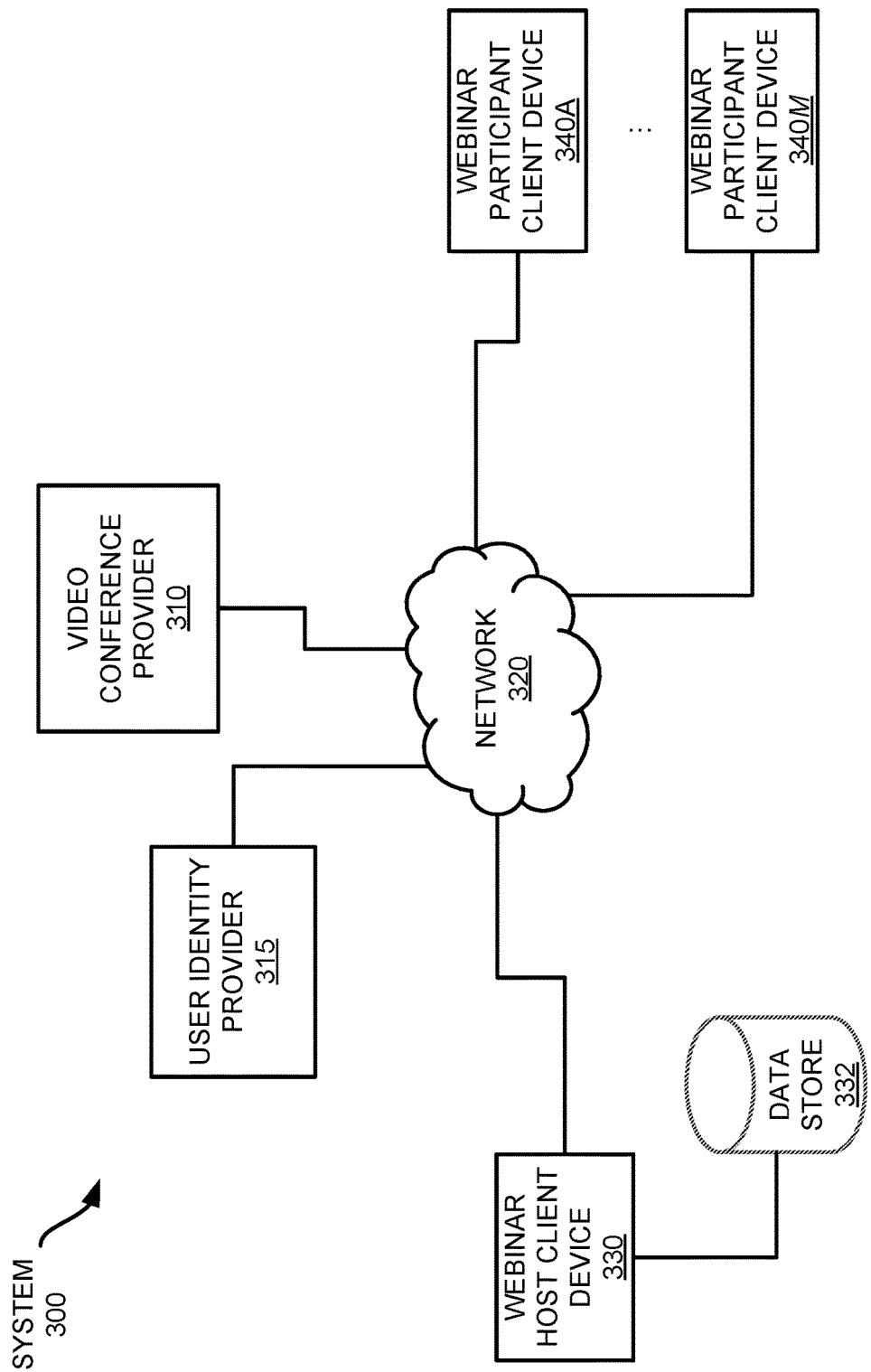

Referring now to FIG. 3, FIG. 3 shows an example system 300 for enabling breakout rooms in webinars. In this example, a video conference provider 310, such as the video conference provider 110, 210 in FIG. 1 or 2, is connected to a communications network 320, such as the internet. A webinar host client device 330, a user identity provider 315, and a number of webinar participant client devices 340a-m (m representing any number of webinar participant client devices in this example) are also connected to the network 320.

The webinar host client device 330 connects to the video conference provider 310 and begins a webinar meeting (or "webinar") at the video conference provider 310, such as by beginning a scheduled webinar, generally as described above with respect to FIGS. 1 and 2. However, when scheduling the meeting, the host schedules the meeting as a webinar. In this example, the video conference provider 310 creates and manages webinar meetings similarly to how it handles conventional meetings as discussed above. However, because webinars generally are intended to operate one-way from the presenter(s) to the participants, the video conference provider 310 may limit certain functionality to general participants to the webinar.

For example, in a webinar the video conference provider 310 may prohibit participants from unmuting their microphone or from streaming video to the webinar for other participants to view. In addition, unlike in a conventional meeting, the participants in a webinar may not receive any information about other participants in the webinar. In a conventional meeting, participants may be able to interact with other participants and see their respective names, such as in close proximity to other participants' video streams or in a list of participants visible in a graphical user interface ("GUI"). Instead, in a webinar, the participants may only be able to see information, e.g., names or video feeds, from the host(s) of the webinar or certain select participants that will be engaged in discussions during the webinar, such as panelists in a panel discussion. Still other limits may be imposed on the various participants, such as their ability to react to occurrences during the webinar, e.g., participants may be allowed to interact with their GUI to raise their hand to ask a question, but may not be allowed to provide any other feedback.

When the video conference provider 310 begins the webinar, it creates a new meeting (including any applicable restrictions, such as those discussed above) and provides video and audio feeds that may be accessed by participants to receive video and audio content during the webinar. Participants, through their respective webinar participant client devices 340a-m, may join the webinar once it has started and connect to the available video and audio feeds.

During the course of the webinar, the webinar host client device 330 may present content to the participants, such as presentation material stored on the data store 332, through a video feed containing such presentation material or using a video feed of the presenter themself (or multiple such video feeds). If multiple different participants will present content, such as in a panel discussion or as co-presenters, such video feeds may be provided by other client devices that have been assigned a presenter or panelist role, such as by the host or by the video conference provider 310. Such roles may remove some or all of the restrictions placed on the other participants in the webinar.

As a part of the webinar, the host may schedule a time when the participants may be assigned to different breakout rooms, such as to allow participants to discussion subjects presented during the webinar, or to engage in activities (e.g., games, training exercises, group projects, etc.) before returning to the webinar at a later time. Thus, the breakout rooms may be configured as traditional meetings, where all participants in the breakout room are able to interact with the other participants, such as by providing audio and video feeds and receiving audio and video feeds from other participants. When the host indicates that the breakout rooms are to be opened and the participants are to be transitioned to their assigned breakout rooms, the video conference provider 310 generates sub-meetings for each of the breakout rooms.

Figure 3B:
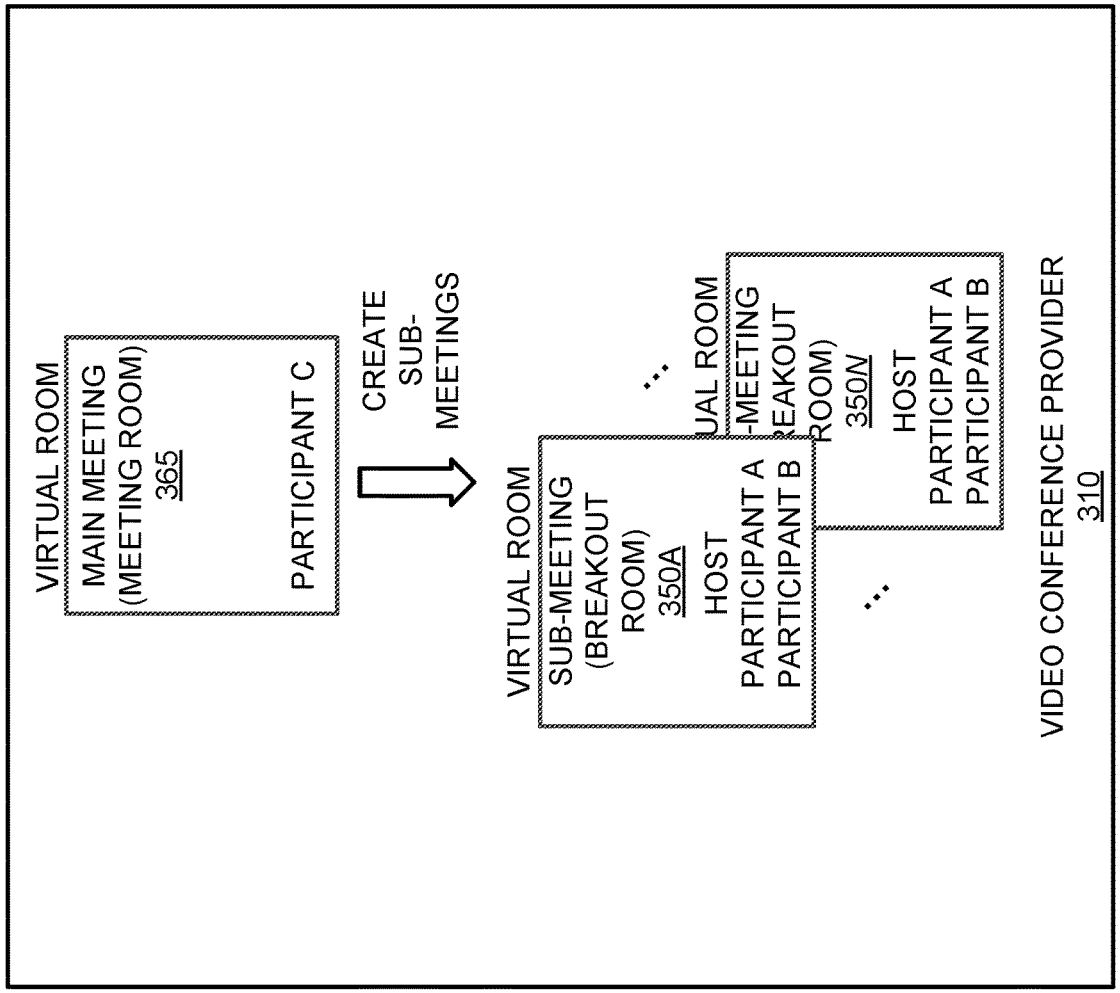

Referring now to FIG. 3B, FIG. 3B illustrates creation of breakout rooms in a webinar. In the example, the video conference provider 310 establishes a main meeting 365, which is nominally in a main meeting room. During the webinar, the host and the various participants are "within" the main meeting room 365. The video conference provider 310 receives multimedia streams from the webinar host client device 330 and from any other participant designated as a presenter, co-host, panelist, etc.; however it does not receive such streams from other participants (except in limited circumstances in some examples, such as if a participant is authorized by a host to ask a question). The video conference provider 310 then publishes those streams as being available for the participants to subscribe to. The various participant client devices subscribe to these multimedia streams to receive the audio and video streams from the host, presenters, etc. In some examples, multiple different audio or video streams may be published for each host, presenter, etc., such as to provide different quality streams, which may be needed depending on the bandwidth available to a particular participant's client device.

At some point during the webinar, the host instructs the video conference provider 310 to create breakout rooms from the main meeting 365. These breakout rooms may have been pre-configured prior to the webinar or may be dynamically created during the webinar, e.g., based on a number of participants and a maximum number of participants per breakout room. To create the breakout rooms, the video conference provider establishes a number of additional meeting rooms like the main meeting, except they may be configured as standard interactive meeting rooms rather than as webinars, i.e., they may allow all of the participants in a breakout room to interact with each other as in an ordinary video conference. However, in some examples, some or all of the breakout rooms may be configured as webinars as well.

Because the breakout rooms are intended to be a part of the webinar hosted in the main meeting room 365, the breakout room meetings 350a-n are not separately scheduled meetings by the video conference provider, e.g., participants will not receive calendar invitation or email to join the breakout room. Instead, the video conference provider 310, as a part of establishing one or more breakout rooms, generates information that the participants' client devices 340a-m may use to join one (or more) of the breakout rooms. Such information may include information to subscribe to one or more multimedia streams provided in the particular breakout room, which may be a URI (e.g., a URL). However, because webinars can have very large numbers of participants, e.g., in the tens of thousands, the video conference provider does not provide information about all breakout rooms to all participants. Instead, it provides more targeted information to each participant, as described in more detail below with respect to FIG. 4.

When a participant joins a breakout room 350a-n, their client device subscribes to one or more multimedia streams available in the breakout room 350a-n that they joined and unsubscribes from the multimedia streams in the main meeting room 365. Thus, the participant begins to receive audio and video from one or more other participants in the same breakout room (assuming other participants are in the room) and, depending on the configuration of the breakout room, may begin providing their own multimedia streams to the breakout room to enable interaction with the other participants. At a later time, when the participant leaves the breakout room 350a-n, they may re-subscribe to the multimedia streams in the main meeting room 365 and unsubscribe from the multimedia streams in the breakout room 350a-n.

Figure 4:
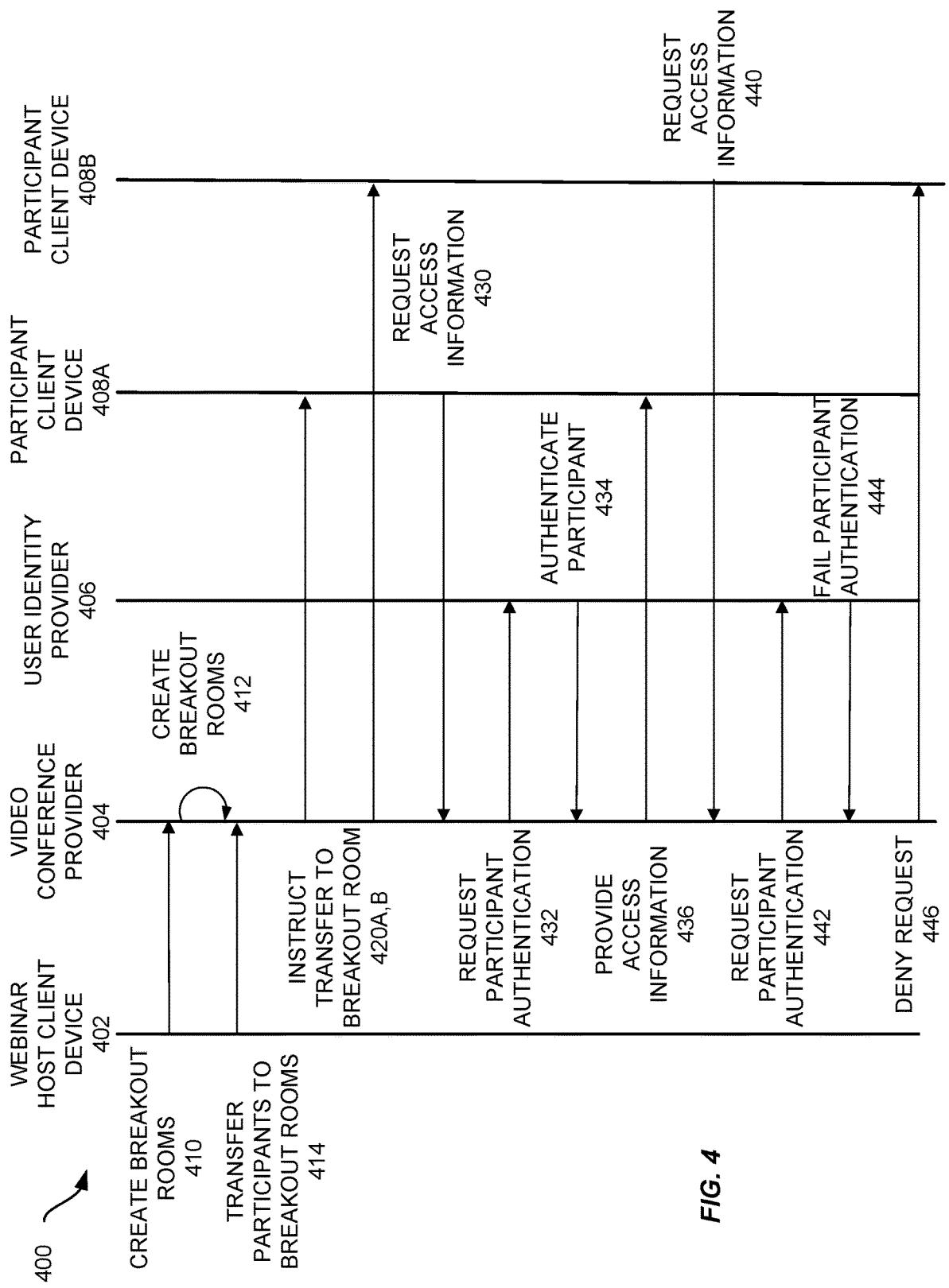
FIG. 4 shows an example sequent for enabling breakout rooms in webinars.

Referring now to FIG. 4, FIG. 4 shows an example sequence 400 of events for enabling breakout rooms in webinars. The sequence 400 is described with respect to a system that includes a video conference provider 404, a user identity provider 406, a webinar host client device 402, and participant client devices 408a-b. Two participant client devices 408a, 408b are discussed with respect to FIG. 4, but it should be appreciated that any number of participant client devices may participate in the sequence. Further, the sequence 400 assumes that the webinar host client device 402 and the participant client devices 408a-b are all participating in the same on-going webinar hosted by the video conference provider 404.

At some time during the webinar, the host determines that it is time to break up the webinar participants into breakout rooms, and issues a command using video conference software executing on the webinar host client device 402 to command the video conference provider 404 to create one or more breakout rooms 410 for the webinar's participants. The command may include a number of breakout rooms to create or reference a previously provided configuration (e.g., established when the meeting was scheduled) that indicates a number of breakout rooms to create. In some examples, the command may indicate the number of participants to transfer to each breakout room, which can then be used to determine a number of breakout rooms to be created, e.g., (number of participants)/(number of participants per breakout room), or it may include an allocation of some or all participants to one or more breakout rooms.

When the video conference provider 404 receives the command, it generates one or more breakout rooms 412 based on the command. The webinar host client device 402 then sends a command to transfer participants to breakout rooms 414. The allocation of participants to breakout rooms may be pre-determined, such as based on information previously provided by the webinar host to the video conference provider, or it may be determined according to other criteria, e.g., based on preferences identified by the participants, or even randomly.

Once the video conference provider 404 receives the command to transfer participants to breakout rooms 414, it transmits an instruction 420a,b to each participant client device that includes the breakout room the respective participant is assigned to. For example, the instruction 420a sent to participant client device 408a may specify one breakout room, while the instruction 420b sent to participant client device 408b may specify a different breakout room.

When each participant client device 408a,b receives the instruction to transfer to a breakout room, the respective client device 408a,b responds with a request for access information to join the corresponding breakout room 430, 440. Thus, these portions of the sequence may happen in parallel or substantially simultaneously.

Beginning with participant client device 408a, the participant client device 408a requests access information 430 from the video conference provider 406 to join the breakout room identified in the instruction to transfer 420a. In this example, the request also includes identity information associated with the user of the participant client device 408a, such as a username, an email address, an account identifier, a device name, a device ID, a telephone number, etc. In different examples, different types of identity information may be provided.

When the video conference provider 404 receives the request for the access information, the video conference provider 4040 first confirms that the requested information corresponds to the breakout room that the participant is assigned to, e.g., it confirms that the request is to join the same breakout room the participant client device was instructed to join. It then may attempt to authenticate the user of the participant client device 408a (or simply the participant client device 408a itself). To do so, it may transmit a request to authenticate the participant 432 to a user identity provider, generally as described above with respect to FIGS. 1 and 2. In response, the user identity provider 406 responds, in this example, that the participant has been authenticated 434. In response to receiving the authentication, the video conference provider transmits access information to the participant client device 408a to enable it to join the breakout room, such as by subscribing to one or more multimedia streams associated with the breakout room, or obtain cryptographic keys to enable access to one or more multimedia streams. The participant client device 408a can then join the breakout room using the supplied access information.

Considering the second participant client device 408*b*, it also requests access information 440 from the video conference provider 404 to join its assigned breakout room. In this example, however, the video conference provider 404 requests that the user identity provider 406 authenticate the participant, but the user identity provider 406 fails to authenticate the user 444. In response, the video conference provider 404 denies the participant client device's request 446. Thus, the video conference provider 404 is able to ensure that only authenticated participants are able to join breakout rooms they were not assigned to. In another example, a participant client device 408*a,b* may attempt to join a breakout room to which it was not assigned. In such an example, the video conference provider 404 may determine the discrepancy and simply deny the request or re-transmit the instruction to join the correct breakout room. Such functionality may prevent participants from joining breakout rooms to which they were not assigned. This may help prevent participants from inadvertently joining the wrong room and may also help prevent malicious actors from joining breakout rooms. Further, by sending individual instructions to each client device 408*a,b* rather than broadcasting all breakout room information to all participants as may be the case in non-webinar meetings, the video conference provider 404 may maintain better control over which clients join which breakout rooms. It should be appreciated that it may broadcast some or all breakout room assignments, but not the information needed to join any breakout room.

As mentioned above, the sequence 400 shown in FIG. 4 need not be performed as sequential steps, but instead, certain aspects may be performed asynchronously to others. For example, if multiple different client devices are attempting to join breakout rooms, each may progress through a sequence similar to sequence items 430-436, if the client is authenticated, or through a sequence similar to sequence items 440-446, if the client is not authenticated, independently of the sequence items performed by other clients. Similarly, while this example illustrates the use of sequence items to authenticate participants, some examples may omit authentication. Thus, the system may restrict a client device to only joining the breakout room to which it is assigned, but it may not otherwise attempt to authenticate the participant using the client device. In further examples, participants may be allowed to select any breakout room to join and the video conference provider may respond to any request for access information to join a breakout room by providing access information, such as described above with respect to sequence item 436.

Figure 5:
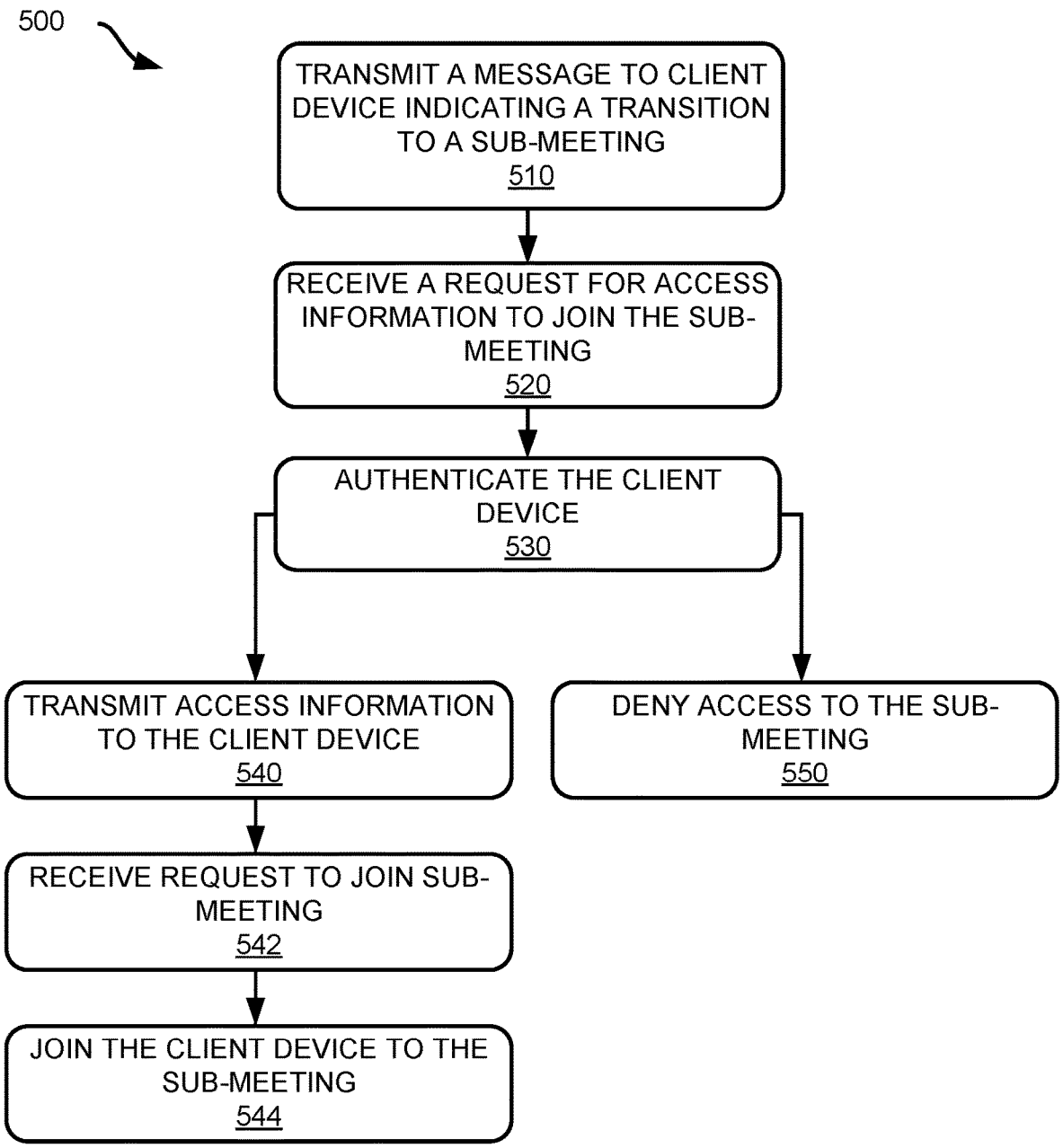
FIG. 5 shows an example method for enabling breakout rooms in webinars.

Referring now to FIG. 5, FIG. 5 shows an example method 500 for enabling breakout rooms in webinars. The method 500 will be described with respect to the system 300 shown in FIGS. 3A-3B; however, any suitable system according to this disclosure may be used.

At block 510, video conference provider 310 transmits a message to a first client device 340*a* indicating a transition to a first sub-meeting of a webinar. In this example, the first client device 340*a* is connected to a main meeting of the webinar and the message indicates that the first client device 340*a* is to transition to breakout room 350*a*. To provide the indication, the message may include a meeting identifier (e.g., for the webinar meeting), a breakout room identifier, an encrypted token, etc. For example, the token may be encrypted with a public key of a key pair owned by the participant.

At block 520, the video conference provider 310 receives a request for access information to join the first sub-meeting 350*a* from the first client device 340*a*. In this example, the request includes a breakout room identifier and a participant identifier; however, additional or different types of information may be provided, such as a device identifier, a meeting identifier, an encrypted token, etc. The participant identifier may be any suitable identifier, such as a name, an account username, an email address, a phone number, etc. Such information may be provided to a user identity provider to authenticate the user, as will be described below. The device identifier or the meeting identifier may be used by the video conference provider 310 to associate the request with a particular meeting and to identify the requested breakout room. The encrypted token may be a token previously encrypted and sent to the participant as described above with respect to block 510, which has been decrypted by the client device 340*a* and re-encrypted using a public key of a key pair owned by the video conference provider 310. Still any other type of information may be provided with the request.

At block 530, the video conference provider 310 may authenticate the participant based on the request. In this example, the video conference provider 310 authenticates the participant by communicating with a user identity provider 315, which may respond either authenticating the participant or not authenticating the participant. In some examples, the video conference provider 310 itself may act as a user identity provider 315, such as in the case when the participant has a registered account with the video conference provider 310. In some examples, the video conference provider 310 may transmit an encrypted token to the participant's client device 340*a* as described above. The client device 340*a* may decrypt the token and then re-encrypt the token using a public key available from the video conference provider 310. The video conference provider 310 may then decrypt the token and compare it against the token transmitted to the client device 340*a*. If the tokens are identical, the video conference provider 310 may determine that the participant is authenticated. If the video conference provider 310 successfully authenticates the participant, the method 500 proceeds to block 540. Otherwise, the method 500 proceeds to block 550.

It should be appreciated that while some examples according to this disclosure may authenticate the participant, other examples may not. In some such examples, the video conference provider 310 may instead determine whether the participant has requested access information for the same breakout room to which they were assigned. If so, the method proceeds to block 540; otherwise it proceeds to block 550. However, in some examples, the video conference provider 310 may allow a participant to request access to any breakout room. In such an example, the method 400 may always proceed to block 540, or it may proceed to block 550 if the requested breakout room has reached a capacity limit or has otherwise been limited, closed, disabled, etc.

At block 540, the video conference provider 310 transmits the access information for the first sub-meeting 350*a* to the first client device 340*a*. In this example, the access information includes a URI corresponding to the sub-meeting 350*a*. In some examples, the access information may include one or more URIs corresponding to one or more multimedia streams available in the sub-meeting 350*a*. The access information may include other information as well, such as one or more encryption keys to access encrypted multimedia streams, a participant list, an identity of the host(s) of the breakout room, etc.

At block 542, the video conference provider 310 receiving a request to join the first sub-meeting 350*a* from the first client device 340*a*, where the request is based on the access information for the first sub-meeting 350a. In this example, the video conference provider 310 receives a request at the URI provided in the access information. In addition, the video conference provider 310 may also receive other information, such as a participant identifier (e.g., a name, a username, an email address, a telephone number, a device identifier, etc.), a public encryption key of a key pair owned by the participant, etc.

At block 544, the video conference provider 310 joins the first client device 340a to the first sub-meeting 350a. To join the first client device 340a to the sub-meeting 350a, the video conference provider 310 may provide information to access one or more multimedia streams, such as URIs for such multimedia streams. In some examples, the video conference provider 310 may provide one or more cryptographic keys to access the multimedia streams. The video conference provider 310 may add the participant using the first client device 340a to a participant list for the sub-meeting. The participant list may be available to view by any of the participants in the sub-meeting 350a, such the identities of the participants may be obtained by the video conference provider 310 when the participants request to join the sub-meeting. In some examples, the video conference provider 310 may associate the participant information with the sub-meeting when the sub-meeting is created.

Once the first client device 350a has been joined to the sub-meeting 350a, the method 500 concludes for that client device; however, it should be appreciated that the method 500 may be performed any number of times to accommodate different client devices 340a-n attempting to join the various sub-meetings from the webinar.

If, at block 550, the video conference provider 310 is unable to authenticate the participant, it denies access to the sub-meeting to the first client device 340a, such as by transmitting a message indicating the client device 340a has not joined the sub-meeting 350a or by transmitting a message indicating that the participant was not authenticated. In some examples, the video conference provider 310 may allow the participant to re-try authentication, such as by providing information such as a username and password associated with a user identity provider 315 or by indicating that the user should contact the user identity provider 315 to login to gain access to the sub-meeting.

Figure 6:
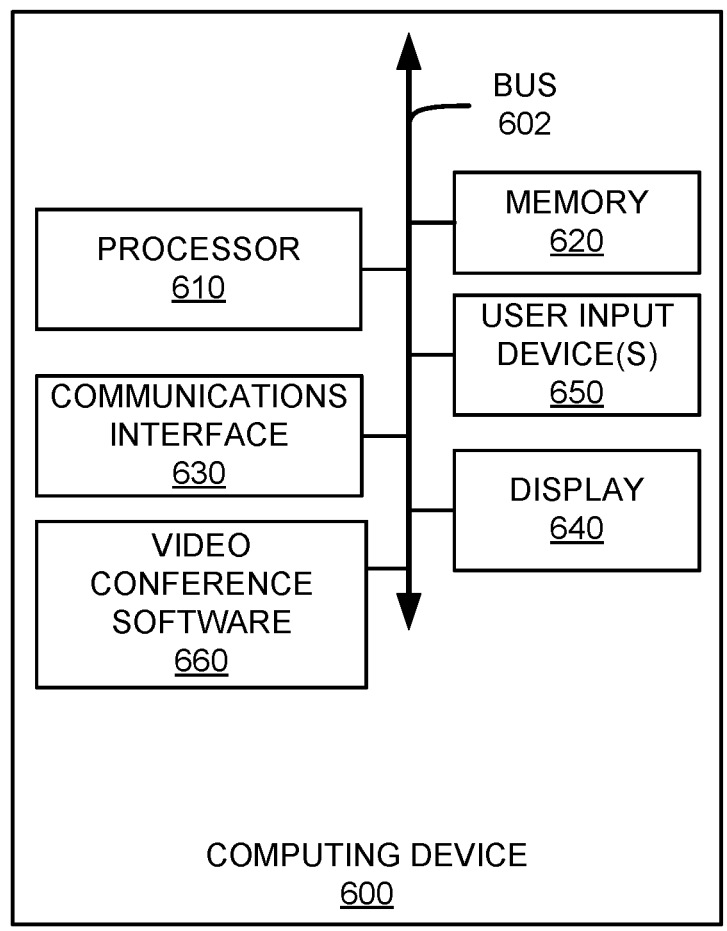
FIG. 6 shows an example computing device suitable for use with example systems and methods for enabling breakout rooms in webinars according to this disclosure.

Referring now to FIG. 6, FIG. 6 shows an example computing device 600 suitable for use in example systems or methods for enabling breakout rooms in webinars according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for enabling breakout rooms in webinars according to different examples, such as part or all of the example method 500 described above with respect to FIG. 5. The computing device 600, in this example, also includes one or more user input devices 650, such as a keyboard, mouse, touchscreen, microphone, etc., to accept user input. The computing device 600 also includes a display 640 to provide visual output to a user.

In addition, the computing device 600 includes video conference software 660 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
transmitting, by a virtual conference provider to a plurality of client devices connected to a main meeting of a webinar, a message indicating a transition to one or more sub-meetings of the webinar, each message identifying one of the one or more sub-meetings;
receiving, from a subset of the plurality of client devices, requests for access information for a respective one of the one or more sub-meetings;
in response to authenticating a request, providing, to the corresponding client device of the subset of the plurality of client devices, the access information for the respective one of the one or more sub-meetings;
receiving from a first client device a request to join a first sub-meeting, the request based on the access information; and
joining the first client device to the first sub-meeting.

2. The method of claim 1, further comprising authenticating each client device of the subset of the plurality of client devices based on a respective request for the access information; and
wherein transmitting the access information is in response to successfully authenticating the corresponding client device of the subset of the plurality of client devices.

3. The method of claim 1, wherein authenticating the first client device comprises receiving an input from a host of the webinar confirming an identity of a participant using the first client device.

4. The method of claim 3, wherein authenticating the first client device comprises presenting a video feed from the first client device to the host.

5. The method of claim 1, wherein the request for the access information comprises an encrypted token, and wherein authenticating the first client device comprises decrypting the encrypted token.

6. The method of claim 1, wherein the request for the access information comprises an identification of the respective one sub-meeting of the one or more sub-meetings, and further comprising confirming the corresponding client device of the subset of the plurality of client devices is assigned to the one sub-meeting.

7. The method of claim 1, further comprising distributing the requests for access information to different servers of a plurality of servers operated by the virtual conference provider.

8. The method of claim 1, wherein the request for access information comprises one or more of participant identifier, a device identifier, or sub-meeting identifier.

9. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
transmit, to a plurality of client devices connected to a main meeting of a webinar, a message indicating a transition to one or more sub-meetings of the webinar, each message identifying one of the one or more sub-meetings;
receive, from a subset of the plurality of client devices, requests for access information for a respective one of the one or more sub-meetings;
in response to authenticating a request, provide, to the corresponding client device of the subset of the plurality of client devices, the access information for the respective one of the one or more sub-meetings;
receive from a first client device a request to join a first sub-meeting, the request based on the access information; and
join the first client device to the first sub-meeting.

10. The system of claim 9, wherein the one or more processors are configured to execute further processor-executable instructions stored in the non-transitory computer-readable medium to:
authenticate each client device of the subset of the plurality of client devices based on a respective request for the access information; and
transmit the access information in response to successfully authenticating the corresponding client device of the subset of the plurality of client devices.

11. The system of claim 9, wherein the one or more processors are configured to execute further processor-executable instructions stored in the non-transitory computer-readable medium to receive an input from a host of the webinar confirming an identity of a participant using the first client device.

12. The system of claim 11, wherein the one or more processors are configured to execute further processor-executable instructions stored in the non-transitory computer-readable medium to present a video feed from the first client device to the host.

13. The system of claim 9, wherein the request for the access information comprises an encrypted token, and wherein the one or more processors are configured to execute further processor-executable instructions stored in the non-transitory computer-readable medium to decrypt the encrypted token.

14. The system of claim 9, wherein the request for the access information comprises an identification of the respective one sub-meeting of the one or more sub-meetings, and wherein the one or more processors are configured to execute further processor-executable instructions stored in the non-transitory computer-readable medium to confirm the corresponding client device of the subset of the plurality of client devices is assigned to the one sub-meeting.

15. The system of claim 9, wherein the request for access information comprises one or more of participant identifier, a device identifier, or sub-meeting identifier.

16. A non-transitory computer-readable medium comprising processor-executable instructions configured to cause one or more processors to:
transmit, to a plurality of client devices connected to a main meeting of a webinar, a message indicating a transition to one or more sub-meetings of the webinar, each message identifying one of the one or more sub-meetings;

receive, from a subset of the plurality of client devices, requests for access information for a respective one of the one or more sub-meetings;

in response to authenticating a request, provide, to the corresponding client device of the subset of the plurality of client devices, the access information for the respective one of the one or more sub-meetings;

receive from a first client device a request to join a first sub-meeting, the request based on the access information; and join the first client device to the first sub-meeting.

17. The non-transitory computer-readable medium of claim 16, further comprising processor-executable instructions configured to cause the one or more processors to:

authenticate each client device of the subset of the plurality of client devices based on a respective request for the access information; and transmit the access information in response to successfully authenticating the corresponding client device of the subset of the plurality of client devices.

18. The non-transitory computer-readable medium of claim 16, wherein the request for the access information comprises an identification of one sub-meeting of the one or more sub-meetings, and further comprising processor-executable instructions configured to cause the one or more processors to confirm the corresponding client device of the subset of the plurality of client devices is assigned to the respective one sub-meeting of the one or more sub-meetings.

19. The non-transitory computer-readable medium of claim 16, further comprising processor-executable instructions configured to cause the one or more processors to receive an input from a host of the webinar confirming an identity of a participant using the first client device.

20. The non-transitory computer-readable medium of claim 16, wherein the request for access information comprises an encrypted token, and further comprising processor-executable instructions configured to cause the one or more processors to decrypt the encrypted token.

* * * * *